United States Patent
Clemm et al.

(10) Patent No.: US 9,665,367 B2
(45) Date of Patent: *May 30, 2017

(54) UNIFORM REFERENCES

(71) Applicant: International Business Machines Corporation, Armonk, NY (US)

(72) Inventors: Geoffrey M. Clemm, Concord, MA (US); Herbert A. Miller, Littleton, MA (US); Allan R. Tate, Bedford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/934,128

(22) Filed: Nov. 5, 2015

(65) Prior Publication Data

US 2016/0062766 A1 Mar. 3, 2016

Related U.S. Application Data

(63) Continuation of application No. 11/140,399, filed on May 27, 2005, now Pat. No. 9,207,932.

(60) Provisional application No. 60/574,954, filed on May 27, 2004.

(51) Int. Cl.
G06F 9/44 (2006.01)

(52) U.S. Cl.
CPC ............ *G06F 8/71* (2013.01); *G06F 8/73* (2013.01); *G06F 8/75* (2013.01)

(58) Field of Classification Search
CPC ..... G06F 8/70; G06F 8/71; G06F 8/73; G06F 8/75; G06F 17/3023; G06F 9/44536
See application file for complete search history.

(56) References Cited

U.S. PATENT DOCUMENTS

| | | | | | |
|---|---|---|---|---|---|
| 5,339,435 | A | * | 8/1994 | Lubkin | G06F 8/71 709/220 |
| 5,418,957 | A | * | 5/1995 | Narayan | G06F 8/33 707/999.001 |
| 5,437,029 | A | * | 7/1995 | Sinha | H04L 29/06 |
| 5,574,898 | A | * | 11/1996 | Leblang | G06F 11/3476 |
| 5,649,200 | A | * | 7/1997 | Leblang | G06F 8/71 707/999.202 |
| 5,805,889 | A | * | 9/1998 | Van De Vanter | G06F 8/71 707/E17.005 |

(Continued)

OTHER PUBLICATIONS

Capasso, Ralph, et al, *Configuration Management—It's Not Just for Source Code*; first published in The Rational Edge at http://www.therationaledge.com/content/feb_01/f_cm_rc.html; May 23, 2003.

*Primary Examiner* — Matthew Brophy
(74) *Attorney, Agent, or Firm* — Steven M. Greenberg, Esq.; CRGO Law

(57) ABSTRACT

Embodiments of the present invention provide a novel and non-obvious method, system and computer program product for uniform references to artifacts in a software configuration management tool. In one embodiment, a data processing system configured to resolve artifact references can include a software configuration management tool and uniform reference resolution logic coupled to the tool. In this regard, the uniform reference logic can be programmed to resolve a path name to a referenced artifact by processing a uniform reference specifying the referenced artifact.

11 Claims, 3 Drawing Sheets

(56) References Cited

U.S. PATENT DOCUMENTS

| | | | | |
|---|---|---|---|---|
| 5,832,527 | A * | 11/1998 | Kawaguchi | G06F 17/30067 |
| 5,838,970 | A * | 11/1998 | Thomas | G06F 9/465 |
| | | | | 719/316 |
| 5,905,990 | A * | 5/1999 | Inglett | G06F 17/30067 |
| 6,061,692 | A * | 5/2000 | Thomas | G06F 17/30362 |
| | | | | 707/613 |
| 6,101,537 | A * | 8/2000 | Edelstein | G06F 17/30887 |
| | | | | 707/E17.115 |
| 6,421,719 | B1 * | 7/2002 | Lewis | G06F 21/30 |
| | | | | 709/220 |
| 6,460,052 | B1 * | 10/2002 | Thomas | G06F 17/30309 |
| | | | | 707/695 |
| 6,681,382 | B1 * | 1/2004 | Kakumani | G06F 8/71 |
| | | | | 707/999.103 |
| 6,738,970 | B1 * | 5/2004 | Kruger | G06F 8/60 |
| | | | | 717/169 |
| 6,842,897 | B1 * | 1/2005 | Beadle | G06F 9/445 |
| | | | | 717/121 |
| 6,928,637 | B2 * | 8/2005 | Leherbauer | G06F 8/71 |
| | | | | 717/122 |
| 7,103,874 | B2 * | 9/2006 | McCollum | G06F 8/36 |
| | | | | 709/220 |
| 7,167,865 | B1 * | 1/2007 | Tharp | G06Q 10/10 |
| 7,194,730 | B2 * | 3/2007 | Pramberger | G06F 8/71 |
| | | | | 717/120 |
| 8,732,294 | B1 * | 5/2014 | Rice | G06F 8/40 |
| | | | | 709/223 |
| 2001/0039650 | A1 * | 11/2001 | Bodo | G06F 11/3624 |
| | | | | 717/128 |
| 2002/0198873 | A1 * | 12/2002 | Chu-Carroll | G06F 8/36 |
| 2003/0009740 | A1 * | 1/2003 | Lan | G06F 8/20 |
| | | | | 717/102 |
| 2003/0014555 | A1 * | 1/2003 | Cierniak | G06F 9/443 |
| | | | | 719/315 |
| 2003/0088828 | A1 * | 5/2003 | Ackaret | G06F 17/3089 |
| | | | | 715/222 |
| 2003/0115223 | A1 * | 6/2003 | Scott | G06F 8/71 |
| 2004/0216090 | A1 * | 10/2004 | Kaler | G06F 8/71 |
| | | | | 717/121 |
| 2005/0034120 | A1 * | 2/2005 | Fisher | G06F 11/3684 |
| | | | | 717/175 |
| 2005/0044075 | A1 * | 2/2005 | Steere | G06F 17/30067 |
| 2005/0114485 | A1 * | 5/2005 | McCollum | H04L 41/0233 |
| | | | | 709/223 |
| 2005/0226597 | A1 * | 10/2005 | Cobb | G06F 8/71 |
| | | | | 386/200 |

* cited by examiner

UNIFORM REFERENCES

CROSS-REFERENCE TO RELATED APPLICATIONS

This application is a Continuation of U.S. patent application Ser. No. 11/140,399, filed on May 26, 2005, which claims priority to U.S. Provisional Application No. 60/574,954, filed May 27, 2004, which are incorporated herein by reference in their entirety.

BACKGROUND OF THE INVENTION

Field of the Invention

This patent application claims the benefit under 35 U.S.C. §119(e) of presently pending U.S. Provisional Patent Application 60/574,954, entitled UNIFORM REFERENCES, filed on May 27, 2004, the entire teachings of which are incorporated herein by reference.

Description of the Related Art

When building computer software, change happens often. Due to the oft-occurring changes in the software development process, software developers have gravitated towards the use of software configuration management tools. Software configuration management refers to the set of activities that are designed to control change by identifying the work product in a software development cycle which is most likely to change, establishing relationships among the identified work product, defining mechanisms for managing different versions of the identified work product, controlling changes that are imposed upon the work product, and auditing and reporting the changes.

A software configuration management system can provide its users both with the ability to record every detail of components used in a software build, and also with the ability to completely recreate the build environment. This requires the software configuration management system to generate a completely accurate software bill-of-materials for a software build. Additionally, the software configuration management system must be able to free the user from the need to manually maintain and declare most build dependencies in order to improve build accuracy and development productivity.

Software configuration management tools often suffer from a lack of a uniform mechanism for references to objects and resources that span storage boundaries. Most notably, data backup and restore operations, integration, and object and file versioning remain vulnerable to disparate references. In this regard, restoring data to a different location is not possible due to hard coded paths in references to data. Integrations are brittle for the same reason: if files or databases move, many integration links may become broken. Finally, since versioning applies to items beyond simply source code, references must account for items that might be referenced from a view other than the one in which the reference was created.

In order to ensure that persistent references accurately identify the appropriate item in the presence of backup/restore, integration and versioning, it is important to address the following issues:

A reference must be able to identify any persistent logical item;

A reference to an item must not become broken if the component housing that item is moved or restored to a different location;

A reference to an item must not break if the item is put under version control; and, A reference must be able to locate the version of the item in a specified view, not just in the view in which the reference was created.

Most references will point to whatever version of an item that appears in a current view, but some references will refer to a particular version, for example, an activity change set can reference specific versions of an item. Some references will reference whatever item currently has a specified name, while other references point to the item in a view that corresponds to a particular artifact, irrespective of the name of the artifact. If a versioned database is to be incrementally loaded on demand, the reference to a database object must identify the file housing that object. Likewise, an item could be replicated, so a reference must be able to locate the local replica of the item, not just the replica to which the reference was originally created.

BRIEF SUMMARY OF THE INVENTION

Embodiments of the present invention address deficiencies of the art in respect to referencing artifacts in a software configuration management tool and provide a novel and non-obvious method, system and computer program product for uniform references to artifacts in a software configuration management tool. In one embodiment, a data processing system configured to resolve artifact references can include a software configuration management tool and uniform reference resolution logic coupled to the tool. In this regard, the uniform reference logic can be programmed to resolve a path name to a referenced artifact by processing a uniform reference specifying the referenced artifact.

The uniform reference resolution logic can include programming to selectably resolve the path name according to a reference kind specified within the uniform reference. Specifically, the reference kind can be a reference type selected from the group consisting of a component reference, a view reference, an element reference, a version reference and a default object reference. The uniform reference can include at least an original path to the artifact and a reference kind for the uniform reference. The uniform reference further can include a display name including a descriptive name for the artifact. The uniform reference yet further can include a component identifier and component path, an element and a view path, and a format and an object path.

A method for resolving artifact references in a software configuration management tool can include reading a uniform reference to an artifact and parsing the uniform reference to identify the artifact and a reference kind. The method further can include selecting a resolution routine to reduce the uniform reference to a path name to the artifact and executing the resolution routine to produce the path name. In one aspect of the invention, the reference kind can be a reference type selected from the group consisting of a component reference, a view reference, an element reference, a version reference and a default object reference. Moreover, the selecting step can include selecting a resolution routine selected from the group consisting of a component resolution routine, a view resolution routine, an element resolution routine, a version resolution routine and a default object resolution routine.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for uniform references in a software configuration management tool. In accordance with an embodiment of the present invention, a uniform reference can be assembled for an artifact in the software configuration management tool. The uniform reference can include a reference to the location of the referenced artifact and an indication of a reference type. The reference type can include a component relative reference, an element reference, a view reference, a version reference, and a default file-path reference. Utilizing the data incorporated in the uniform reference, the software component management tool can construct a pathname to the referenced artifact irrespective of the view in which the artifact is to be recreated, and whether the artifact has been moved.

Figure 1:
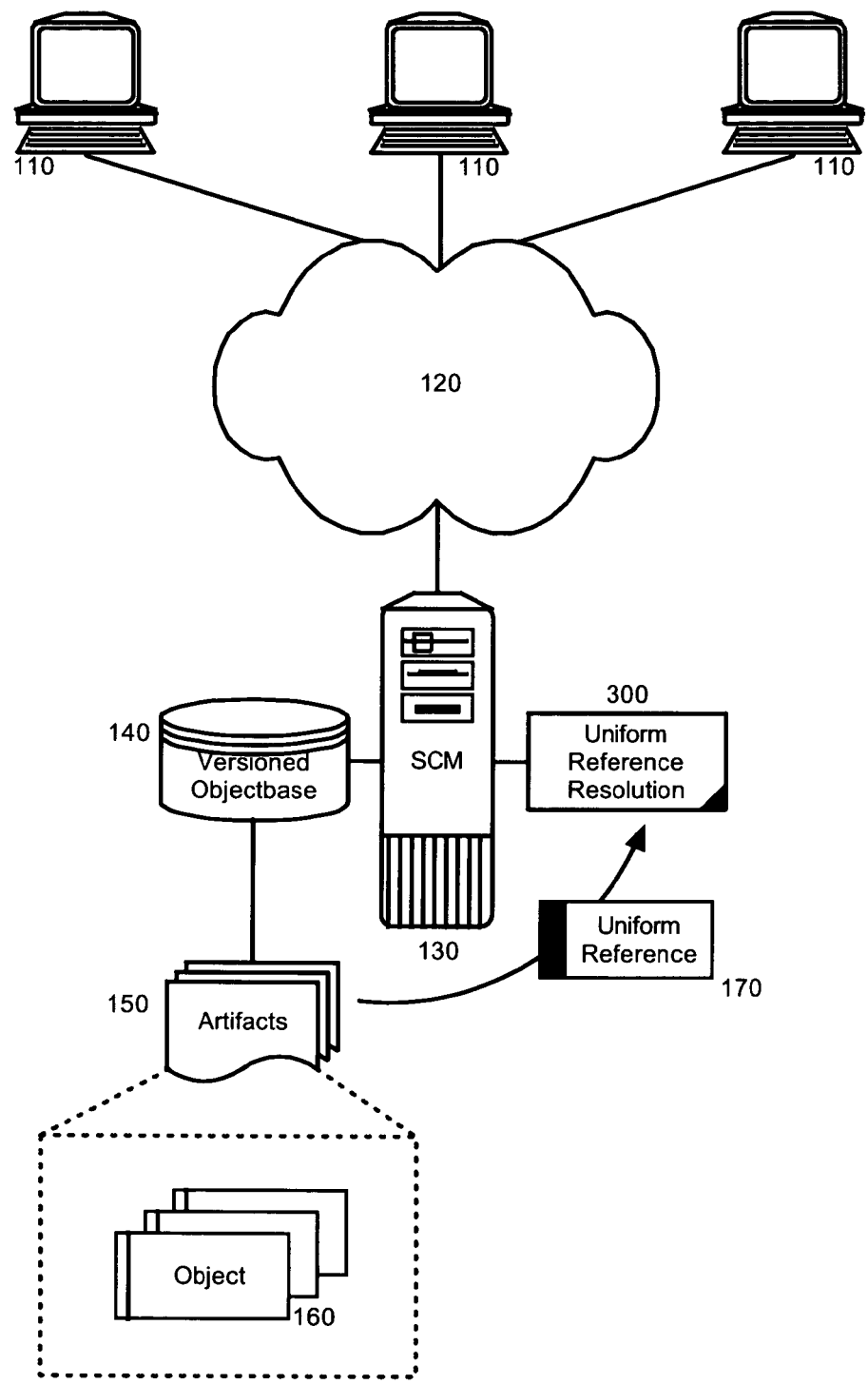
FIG. 1 is a schematic illustration of a data processing system configured to resolve uniform references in a software configuration management tool.

In further illustration, FIG. 1 is a schematic illustration of a software configuration management system configured to resolve uniform references. The data processing system can include a software configuration management tool 130 such as the IBM Rational® ClearCase® software configuration management tool. Optionally, the software configuration management tool 130 can be configured for coupling to one or more development clients 110 over a computer communications network 120. The software configuration management tool 130 can include a versioned object base 140.

The versioned object base 140 can be a permanent, secure data repository. Specifically, the versioned object base 140 can contain artifacts 150 shared by all users. The artifacts 150 can be produced from the processing of one or more contained objects 160 which can include current and historical versions of source files, resources, documents, compilation and development tools, along with derived objects built from the sources by compilers, linkers, and so on. To that end, a uniform reference 170 can be constructed for each of the artifacts 150.

Each uniform reference 170 can specify a reference to the location of the referenced artifact and an indication of a reference type. Utilizing the uniform reference 170, uniform reference resolution logic 300 can resolve a path name to the referenced one of the artifacts 150 irrespective of the view in which the referenced one of the artifacts 150 is to be recreated, and whether the referenced one of the artifacts 150 has been moved within persistent storage.

Figure 2:
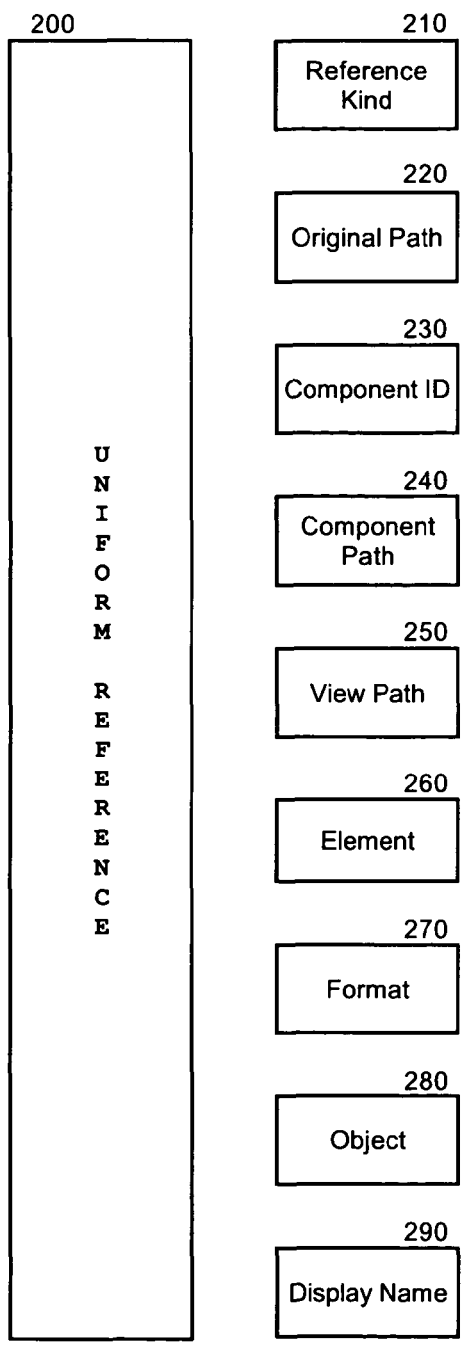
FIG. 2 is a block diagram illustrating a uniform reference.

In more particular illustration of the structure of the uniform reference 200 of FIG. 1, FIG. 2 is a block diagram illustrating a uniform reference 200. The uniform reference 200 can be a multi-component string which can include a reference kind 210. The reference kind 210 identifies the default way in which a physical pathname is constructed from the information stored in the uniform reference 200. Notably, the reference kind 210 can include a component reference, a file reference, and an object reference. A component reference is a reference to a component, a file reference is a reference to a file, and an object reference is a reference to an object that resides in a file.

The uniform reference 200 further can include an original path 220, a component identifier 230 and component path 240, a view path 250 and element 260, and a format 270 and object 280. The original path 220 is the string specified by the client to create the reference. With a file-path reference, the original-path field 220 is used, and the reference identifies whatever item is located at that path. With a component-relative reference, the component 230 and component-path 240 are used, and the uniform reference 200 identifies whatever item is located at that location relative to the component root directory. Specifically, the component 230 can specify a globally unique identifier for the component that contains the specified object. The component-path 240, in turn, identifies a location relative to the root directory of the component specified in the component field.

The uniform reference 200 can utilize the element value 260, the view path 250 to identify whatever version of that artifact is currently visible in a specified view. The view path 250 identifies a location relative to the root directory of the view that can be stored for references to versioned files. In this regard, the view path 250 is used to resolve versioned references in disconnected views. An element value 260, by comparison, is a triple containing the universal unique identifier (UUID) of a versioning repository, the UUID of a versioned object, and the UUID of a version.

The format field 270 can identify the format of the referenced artifact. If the uniform reference contains an object field 280, the uniform reference 200 also can contain a format field 270. The format field 270 can be used to determine whether the reference can be handled internally, or whether an external process will be required to handle the uniform reference 200. The object field 280, in turn, can identify a path to a specific object. If the path is absolute, the path is relative to the root object of a particular artifact. An absolute object path should begin with a segment that defines the type of path being used, in order to allow multiple types of object paths in a single artifact.

Conversely, if the path is relative, the path is relative to the object that contains the uniform reference 200. Optionally, an object path may traverse a relationship that itself is another uniform reference 200. In this case, the object identified by the uniform reference can be obtained, and processing of the remaining segments of the object path continues from that object.

Finally, the uniform reference 200 can include a display name field 290. The display name field 290 can provide a descriptive name for the reference. The display name field 290 can have no effect on locating the referenced artifact, but the display name field 290 can be useful as a title for the reference in a graphical user interface, and for a more intelligible error message when the artifact identified by the uniform reference 200 cannot be located, or the service that understands the specified format is not available.

Figure 3:
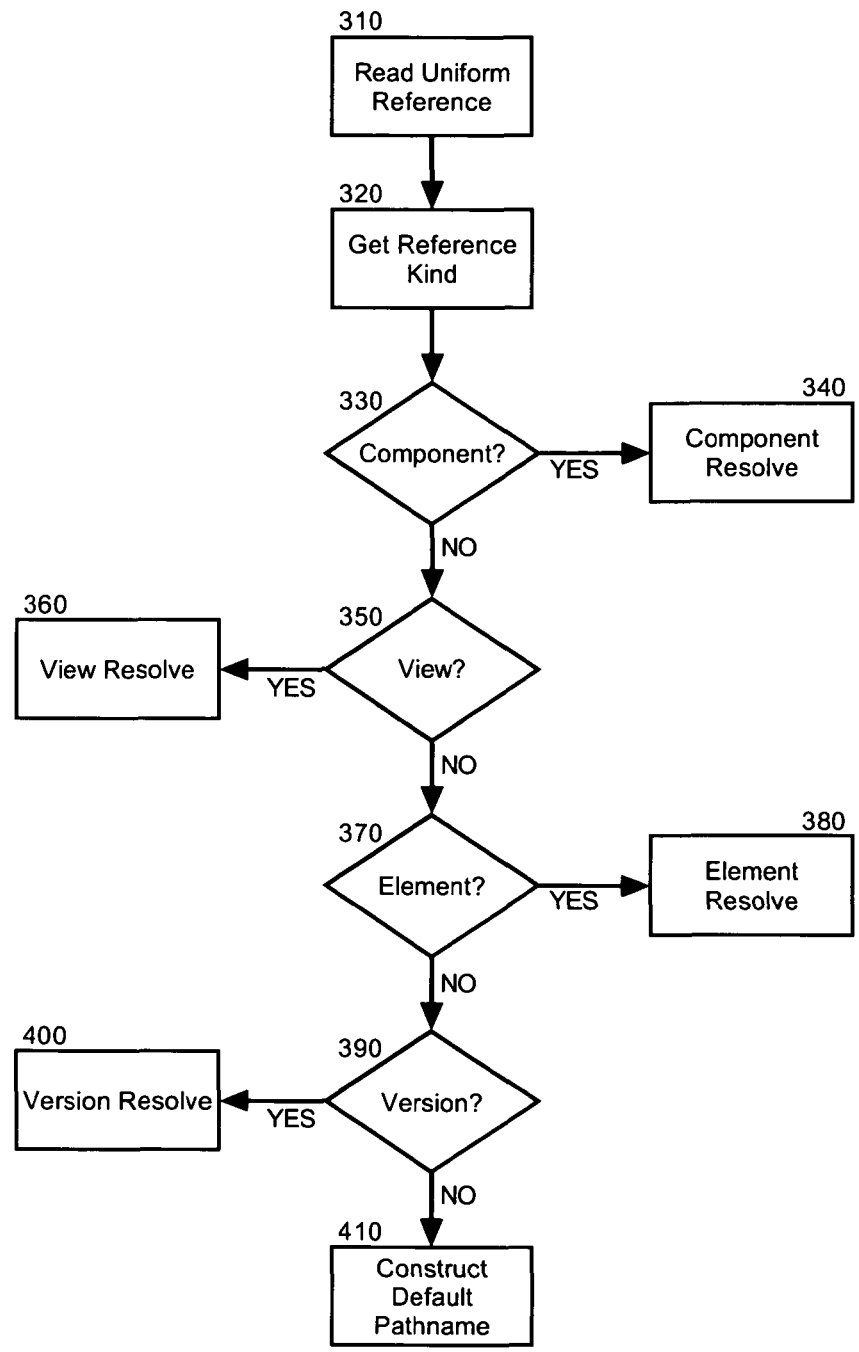
FIG. 3 is a flow chart illustrating a process for resolving uniform references in the system of FIG. 1.

The uniform reference 200 can be resolved to a path name for a specified artifact through the operation of uniform reference resolution logic 300. In more particular illustration, FIG. 3 is a flow chart illustrating a process for resolving uniform references in the system of FIG. 1. Beginning first in block 310, a uniform reference can be read in for processing. The uniform reference can be a string that can be used to reference an arbitrary item both logical and physical on the network. Since every object must reside in some artifact, every uniform reference identifies an artifact, and then optionally identifies some object that resides in that artifact.

In block 320, a reference kind can be retrieved for the uniform reference. In decision block 330, if the reference kind is a component reference, in block 340 a component resolve routine can be executed. Specifically, the component resolve routine is the default resolution mechanism for a component-relative reference. The component resolve routine further can resolve an element reference if the referenced file was in a component when the reference was created. A component location registry must be available on the host of the client that issues a component resolve request. If the component is under version control, a view root must be specified in the component resolve request, since the component location will be relative to the root of the view.

In decision block 350, if the reference is a view reference, in block 360 a view resolution routine can provide an alternative resolution mechanism for an element reference when the versioning server is not available such as when handling a disconnected view. A view name must be specified to resolve a reference relative to the root of the view. In decision block 370, if the reference is an element reference, in block 380, an element resolution routine can resolve the element reference. In this circumstance, the versioning server is to be available on the host of the client that issues an element resolve request.

Finally, in decision block 390, if the reference is a version reference, in block 400, a version resolution routine can return a version-extended pathname that identifies the version that was selected when the reference was originally created. In this case, the versioning server must be available on the host of the client that issues a version resolve request. Otherwise, in block 410, original resolution routine can behave as the default resolution mechanism for a file-path reference. The original resolution routine can be applied to any uniform reference, and can return the original path used to create the uniform reference.

Uniform references provide a method for persistently storing object references and recreating them at a later time. Uniform references work equally well for file system objects and database objects; allow target objects to be relocated without breaking; can work with or without a location service; will resolve into multiple forms as requested by the client; allow the client to specify desired behavior where the reference is tied to a location or object at reference creation time; and, can be resolved within the context of file system views created by a software configuration management system.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A data processing system configured to resolve artifact references, the system comprising:
a software configuration management tool;
and, uniform reference resolution logic coupled to said tool and programmed to resolve a path name to a referenced artifact by processing a uniform reference specifying said referenced artifact;
reading a uniform reference to an artifact in memory of a client computer, said uniform reference comprising a multi-component string including a reference kind component indicating which type of reference is represented by the uniform reference, wherein the reference kind is configurable to represent any of a plurality of reference types comprising a component-relative reference, a view reference, an element reference, a version reference and a default file-path reference, and further wherein the multi-component string further comprises as least two of an original path, a component identifier, component path, a view path, and element value, a format field and an object field;
parsing said uniform reference by a processor of the client computer to identify said artifact and a reference kind indicating a type of said artifact referenced by the uniform reference;
selecting, by the processor based on the reference kind component, a selected resolution routine, to reduce said uniform reference to a path name to said artifact, the resolution routine comprising wherein if the reference kind indicates a component reference, the processor selects a component resolve routine resolving a location of the component in reference to a component location registry available on a host of the client computer wherein if the reference kind indicates a view reference, the processor selects a view resolution routine providing an alternative resolution mechanism for an element reference when a versioning server is unavailable, wherein if the reference kind indicates an element reference, the processor selects a an element resolution routine when the versioning server is available, wherein if the reference kind indicates a view reference, the processor selects a version resolution routine returning a version-extended pathname that identifies a version selected when the uniform reference had been originally created, wherein the processor selects a original resolution routine to construct a default pathname if no other resolution routine has been selected;

and, executing the selected resolution routine by the processor to produce said path name.

2. The data processing system of claim 1, wherein said uniform reference resolution logic comprises programming to selectably resolve said path name according to a reference kind specified within said uniform reference.

3. The data processing system of claim 2, wherein sad reference kind is reference type selected from the group consisting of a component reference, a view reference, an element reference, a version reference and a default object reference.

4. The data processing system of claim 1, wherein sad uniform reference comprises at least an original path to said artifact and a reference kind for said uniform reference.

5. The data processing system of claim 4, wherein said uniform reference further comprises a display name comprising a descriptive name for said artifact.

6. The data processing system of claim 4, wherein said uniform reference further comprises a component identifier and component path.

7. The data processing system of claim 4, wherein said uniform reference further comprises an element and a view path.

8. The data processing system of claim 4, wherein said uniform reference further comprises a format and an object path.

9. A computer program product comprising a computer usable medium wherein said computer usable medium is not a transitory signal per se, including computer usable program code for resolving artifact references in a software configuration management tool, said computer program product including;

computer usable program code for reading a uniform reference to an artifact in memory of a client computer, said uniform reference comprising a multi-component string including a reference kind component indicating which type of reference is represented by the uniform reference, wherein the reference kind is configurable to represent any of a plurality of reference types comprising a component-relative reference, a view reference, an element reference, a version reference and a default file-path reference, and further wherein the multi-component string further comprises as least two of an original path, a component identifier, component path, a view path, and element value, a format field and an object field;

computer usable program code for parsing said uniform reference to identify said artifact and a reference kind indicating a type of said artifact referenced by the uniform reference;

computer usable program code for selecting, based on the reference kind component, a selected resolution routine to reduce said uniform reference to a path name to said artifact, wherein if the reference kind indicates a component reference, the processor selects a component resolve routine resolving a location of the component in reference to a component location registry available on a host of the client computer wherein if the reference kind indicates a view reference, the processor selects a view resolution routine providing an alternative resolution mechanism for an element reference when a versioning server is unavailable, wherein if the reference kind indicates an element reference, the processor selects a an element resolution routine when the versioning server is available, wherein if the reference kind indicates a view reference, the processor selects a version resolution routine returning a version-extended pathname that identifies a version selected when the uniform reference had been originally created, wherein the processor selects a original resolution routine to construct a default pathname if no other resolution routine has been selected;

and, computer usable program code for executing the selected resolution routine to produce said path name.

10. The computer program product of claim 9, wherein said reference kind is a reference type selected from the group consisting of a component reference, a view reference, an element reference, a version reference and a default object reference.

11. The computer program product of claim 9, wherein said computer usable program code for selecting a resolution routine to reduce said uniform reference to a path name to said artifact comprises computer usable program code for selecting a resolution routine selected from the group consisting of a component resolution routine, a view resolution routine, an element resolution routine, a version resolution routine and a default object resolution routine.

* * * * *